Jan. 20, 1970   R. K. BRODERSEN   3,490,297
DUAL-ROTOR INERTIAL SENSOR
Filed March 23, 1966   3 Sheets-Sheet 1
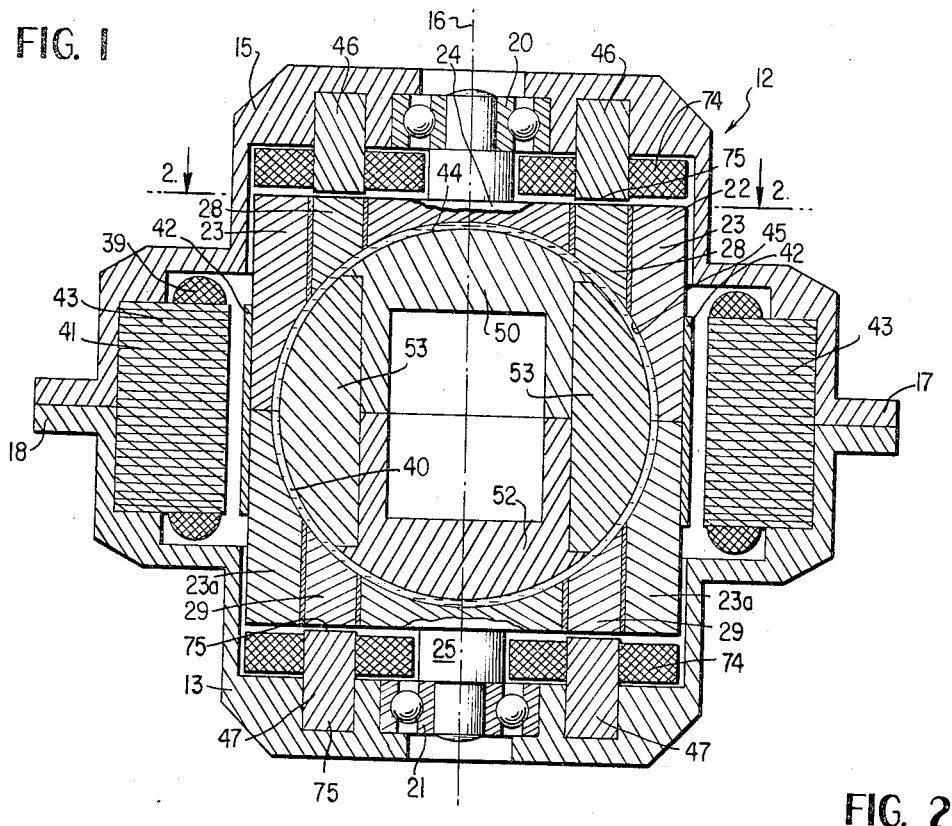
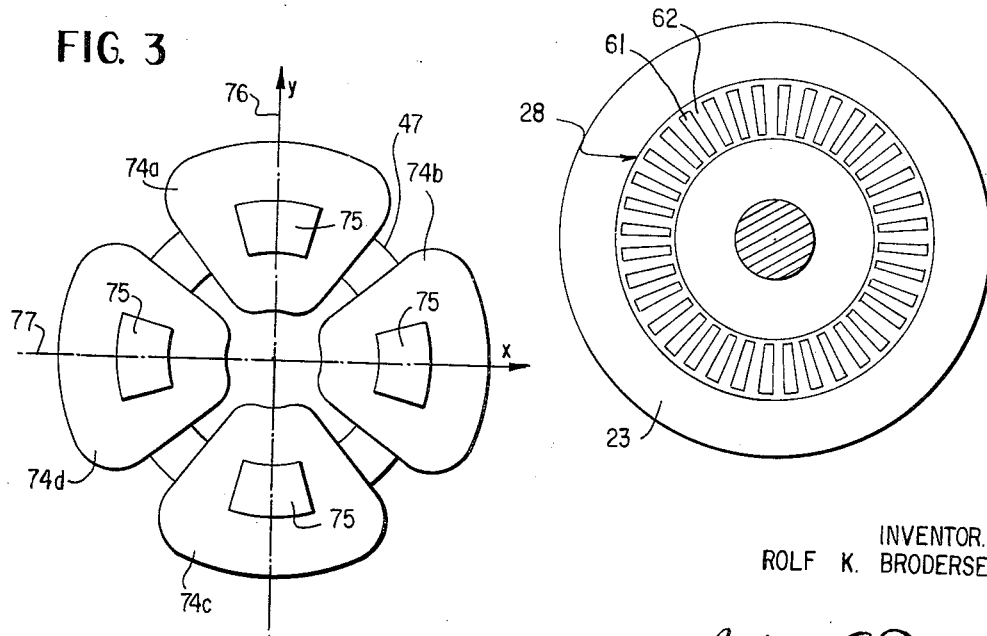
INVENTOR.
ROLF K. BRODERSEN
BY   *Julian C. Renfro*
ATTORNEY.

Jan. 20, 1970

R. K. BRODERSEN 3,490,297

DUAL-ROTOR INERTIAL SENSOR

Filed March 23, 1966

INVENTOR.
ROLF K. BRODERSEN

Julian C. Renfro

ATTORNEY.

Jan. 20, 1970  R. K. BRODERSEN  3,490,297
DUAL-ROTOR INERTIAL SENSOR
Filed March 23, 1966  3 Sheets-Sheet 3
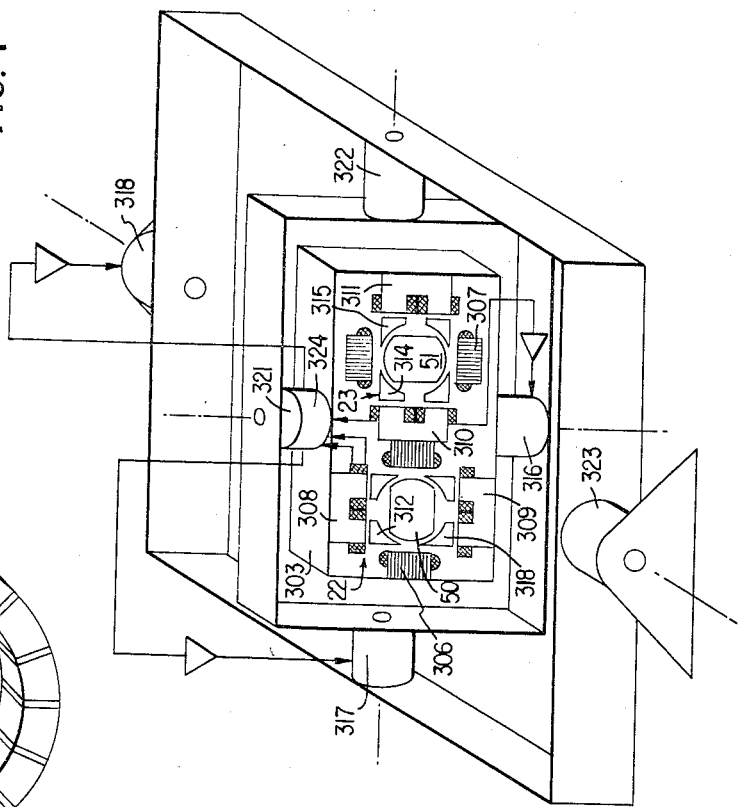
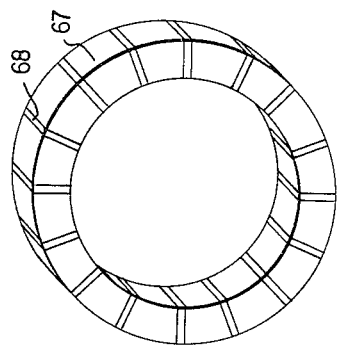
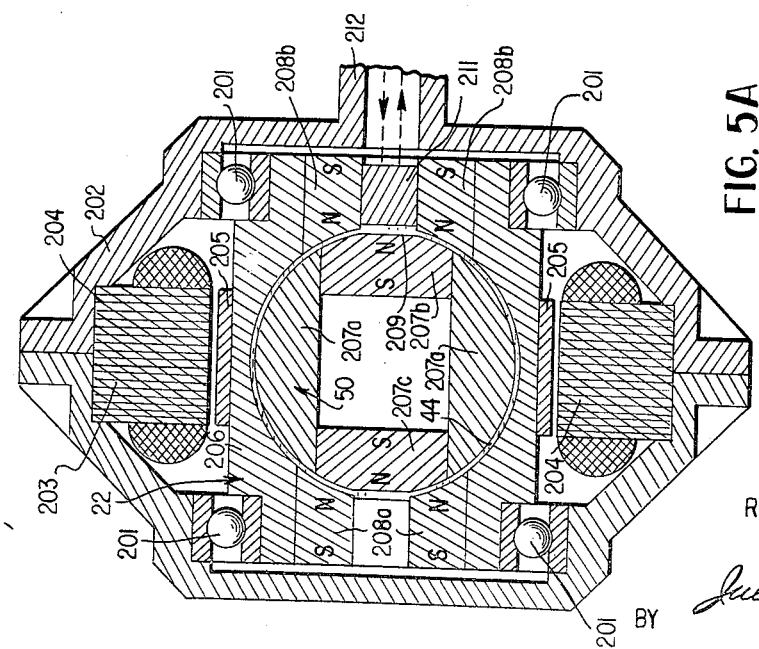
INVENTOR.
ROLF K. BRODERSEN
BY *Julian C. Renfro*
ATTORNEY United States Patent Office 3,490,297
Patented Jan. 20, 1970

3,490,297
DUAL-ROTOR INERTIAL SENSOR
Rolf K. Brodersen, Orlando, Fla., assignor to Martin-Marietta Corporation, New York, N.Y., a corporation of Maryland
Filed Mar. 23, 1966, Ser. No. 536,913
Int. Cl. G01c 19/30
U.S. Cl. 74—5.46                           18 Claims

ABSTRACT OF THE DISCLOSURE

A gimballess dual rotor inertial sensor utilizing a spherical rotor designed to be supported in a cavity defined in a rotatable cylinder, with a film of liquid being disposed between the spherical rotor and the inner walls of such cavity. Various axial centering mechanisms and pickoffs are provided in accordance with this invention, and significantly, a preferred version of this invention can uniquely provide both two axis gyro signals, and three axis accelerometer signals.

This invention relates to angular sensing and measuring devices and more particularly to a gimbal-less two axis gyro.

Gyros have been utilized for the measurement of angular displacement and rate and for the control and guidance of such diverse devices as guided missiles, aircraft, or underwater torpedoes, and the like. However, whereas gyros of conventional design have been found to be satisfactory and adequate for application in the past, it has been found that they become increasingly inadequate with the advent of high acceleration missiles. The use of conventional ball bearings for rotatable support of spin motors and in conventional gimbal suspension of gyro rotors appears to account for the inability of most conventionally designed gyros to properly operate in high acceleration environments. To overcome some of the deficiencies experienced in using conventional gyros under high acceleration conditions, gas bearings have been attempted. The use of gas bearings, while achieving somewhat better results than conventional bearings, has necessitated greater system complexity, and, as well, has resulted in the development of air bearing torque problems at high-g loads.

Furthermore, space limtations in missiles, and high-g loads, necessitated the use of gyros with conventional rotors having a small angular momentum. The use of gyros having a small angular momentum results in undesirable gyro inaccuracies and drift due to linear acceleration and fixed bias torques. The problems and deficiencies encountered through the use of gyros of conventional design are pronounced and magnified with their use under high-g conditions.

It is the general purpose of this invention to provide a guidance device utilizing a reliable and accurate sensor which provides angular displacement and/or rate signals by use of a signal gimballess gyro to obtain the advantages attendant known plural guidance devices while reducing substantially the hereinabove listed deficiencies and disadvantages of the same.

It is therefore an object of this invention to provide a system having a single gyro which is capable of supplying two axis angular rate and/or displacement information signals.

It is another object of this invention to provide an economic and simple gimballess two axis gyro having a simple spherical rotor, with a preferred axis of rotation due to a difference in magnitude between polar and equatorial moment of inertia.

It is still a further object of this invention to provide a two axis angular sensor having a floating sphere type rotor which is capable of accurate operation in high acceleration environments.

It is yet a further object of this invention to provide a two axis angular sensor having a floated sphere type rotor which has a sizable angular momentum and accordingly is relatively unsusceptible to high-g loads and error torques.

It is still a further object of this invention to provide a two-axis rate sensor for use in high acceleration environments which does not require isoelastic spin axis bearings and in which the sensor is substantially free of gyro error due to spin axis bearings.

It is a further object of this invention to provide a floated sphere rotor type, two axis angular sensor which is substantially free of mass unbalance normal to the spin-axis.

It is a further object of this invention to provide a two-axis angular sensor with substantially reduced drift from fixed bias torques and mass unbalance normal to the spin-axis by use of case rotation.

It is still a further object of this invention to provide a two axis angular sensor that is not subject to many of the varied torque or drift errors that sensors employing conventional design are subject to.

It is still a further object of this invention to provide a two axis angular sensor having a spherical floated rotor which avoids fluid turbulence effects and yet minimizes bellows problems commonly encountered in spinning fluid gyros.

It is a further object of this invention to provide a two axis angular sensor having electromagnetic structure for magnetic support and centering of a spherical rotor, signal pick-off, and torquer functions.

It is still a further object of this invention to provide a two axis angular sensor having a centrally positioned spin motor.

It is yet a further object of this invention to provide an angular sensor which has a spherical rotor that is partially supported and centered within a rotating spherical cavity by the centrifugal forces of the fluid within which it is immersed.

It is still a further object of this invention to provide a gimballess gyro having a spherical rotor that is fully supported or centered along 3 axes by magnetic means.

It is a further object to provide a two-axes, two-stage gyro with improved performance over single-stage gyros.

It is a further object of this invention to provide an angular sensor which employs a sphere that is centered and supported in radial direction by centrifugal forces.

It is a further object of this invention to provide a two-axis angular sensor which can also, at the same time, perform the functions of a three-axis accelerometer.

To the accomplishment of the foregoing and related ends, said invention then consists of the means hereinafter fully described and particularly pointed out in the claims, the following description setting forth in detail various means of carrying out the invention; said disclosed means, however, constituting but several of the various ways in which the principles of the invention may be used.

In the drawings wherein like reference numerals indicate like parts in the various views:

FIGURE 1 is an elevational view, in cross section of my unique design showing a rotatable outer rotor with a floated spherical inner rotor and the inter-related structural elements necessary for proper operation encased in a housing;

FIGURE 2 is a top view of FIGURE 1, with parts broken away, taken along the line 2—2, to bring out the structural make-up of the novel flux transfer ring utilized, and its physical relationship in the rotatable outer rotor;

FIGURE 3 is a pictorial diagram of the microsyn-type pick-off stator poles and coils employed in obtaining X and Y angular signal measurements, the same microsyn type arrangement being utilized for gyro torquing purposes;

FIGURES 5 and 5A illustrate alternate schemes for centering the inner spherical rotor and as well illustrate alternate optical signal pick-off arrangement which may be employed;

FIGURE 6 illustrates an alternate design of a flux transfer ring which may be utilized in place of the preferred embodiment illustrated in FIGURES 1 and 2; and FIGURE 7 illustrates the use of a floated spherical rotor type three-axis inertial measurement unit.

Figure 5:
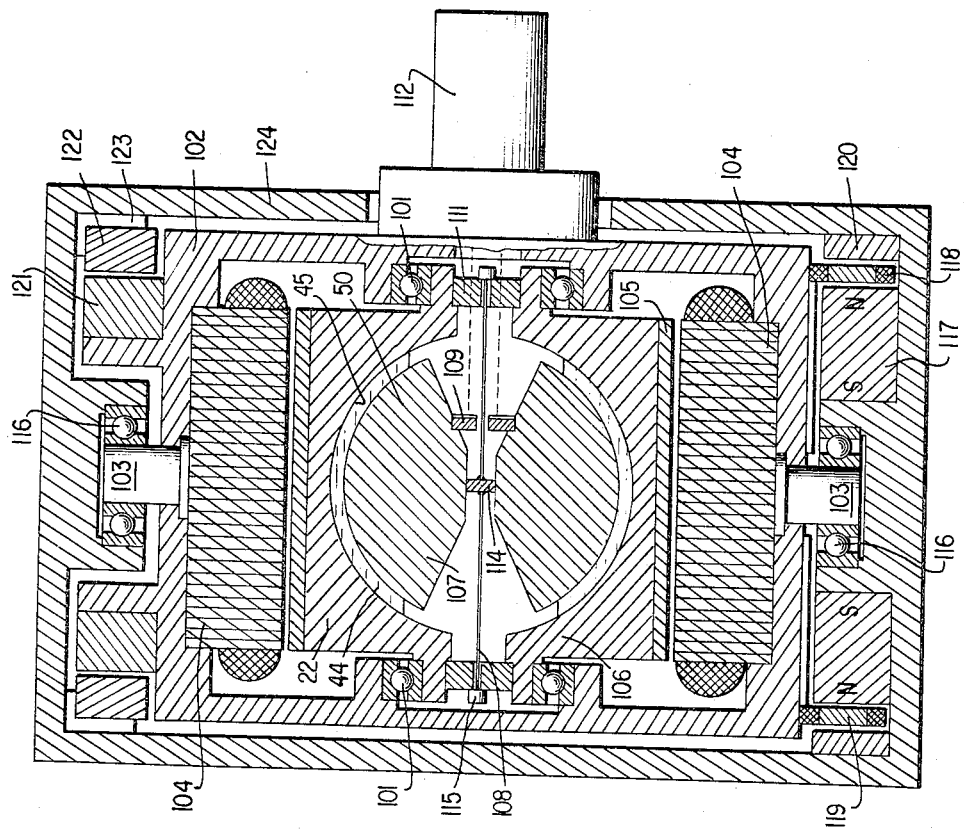

Turning now to the drawings, wherein like reference numerals designate like or corresponding parts throughout the several views, there is shown in cross section at FIGURE 1 a fully enclosed two axis angular sensor 12 embodying the unique features of my invention. Numerals 13 and 15 indicate sections of a typical gyro housing or case. Mounting flanges 17 and 18 are provided for coupling housing elements 13 and 15 together. Housing 13–15 is shown to define a central, transversely oriented spin axis 16.

Rotatably mounted within housing 13–15 by way of suitable bearings 20 and 21 is a rotatable outer rotor 22, which may perhaps be more accurately called a rotatable spherical cavity forming structure. More particularly, rotatable outer rotor 22 is made up of cylindrical sections 23–23a, flux transfer rings 28–29 and end caps 24–25. Outer rotor 22 is rotatably mounted within housing elements 13 and 15 by the cooperation of end caps 24 and 25 respectively with bearings 20 and 21. As shown in FIGURE 1 and in more detail by FIGURE 2, rotor 22 is preferably cylindrical in shape and made up of complementary sections suitably joined to form a central fluid tight spherical cavity 45. It should be appreciated that hollow rotor 50 and its supporting fluid 44 are placed in spherical cavity 45. More specifically, as shown in FIGURES 1 and 2, flux transfer rings comprising cylindrical sections 28–29 are positioned mediate sections 23 and 23a and end caps 24–25.

A spherical cavity 45 is formed as a result of the interrelationship of the parts hereinabove described. Suitable rotative means for spinning the fully enclosed end bearings 20–21 supported rotatable outer rotor is also provided. While any appropriately designed spin motor could have been utilized, it was felt that best results would be obtained through the use of a hysteresis synchronous motor. Hysteresis synchronous motor 41 includes elements 42 and 43.

Fixedly mounted symmetrically about the parting joint formed by the outer surface of annular cylindrical sections 23 and 23a of outer rotor 22, for movement therewith, is an annular hysteresis ring 42. As shown by FIGURE 1, hysteresis ring 42 is symmetrically positioned opposite its associated fixedly mounted stator unit 43. Ring 42 is carefully designed to provide desirable high hysteresis characteristics, while at the same time limiting the magnitude of undesirable eddy current losses.

The field coils of hysteresis motor 41 are designated by numeral 39 and are shown to be fixedly mounted in appropriate chambers of gyro-housing 13–15. While the connections are not shown, it should be appreciated that the field coils 39 of motor stator 42 are connected for energization to an appropriate external power source.

Figure 4:
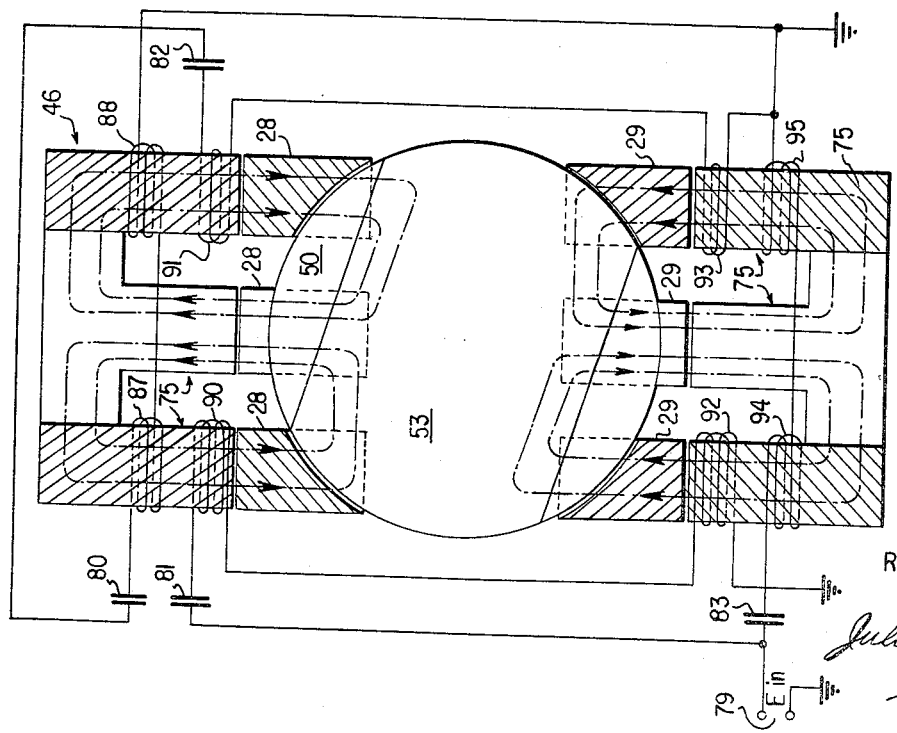
FIGURE 4 illustrates in simplified schematic diagram the flux paths which are utilized to provide electromagnetic support for the inner spherical element of the two axis gyro, of this invention. It is in effect a cross-sectional view of a system similar to FIGURE 1 and shows three poles of the four pole stators utilized.

Also shown in FIGURE 1 to be fixedly mounted to casing 13–15, symmetrically about end caps 24–25 are axially positioned pick-off and torquer stators 46–47. Stators 46–47 which are similar to standard microsyn design and operate in a well known manner, can be of either the 4- or 8-pole variety. For purposes of simplicity of explanation the 4-pole construction as shown by FIGURES 3 and 4 will be detailed. Stators 46–47 are uniquely positioned axially to the outer rotor 22 to provide full 3-axes electromagnetic support and centering of the floated spherical rotor 50. In addition, either one or both stators 46 or 47 can be utilized to provide signal pick-off means or to provide torquing means for the two-axes gyro.

Turning now to spherical rotor 50, it is noted that it includes a main section 52 having an inlaid peripheral segment 53. The actual design characteristics of sphere 50 may be altered for varying conditions and signal readout means employed, as will be explained later in conjunction with FIGURES 5 and 5A. However, FIGURE 1 which utilizes electromagnetic read-out means preferably includes a sphere 50 of hollow construction. This is adequately brought out by FIGURE 1 which illustrates that the core of section 52 is hollow. Main section 52 of hollow sphere 50 is preferably made of a light, nonmagnetic metal; however, it can also be made of such diverse materials as ceramic, glass or plastic. On the other hand, peripheral ring 53, which cooperates with stators 46–47 and flux transfer rings 28–29 to magnetically support and center inner rotor 50, is made of magnetically soft material such as ferrite or an electrical iron or steel alloy with high permeability and high resistivity. In this manner a high permeability and low eddy current path is provided across the central periphery of the sphere. It is evident from FIGURE 1 that the magnetically conductive segment 53 is symmetrically centered about the spin axis 16 of rotatable outer rotor 22. Accordingly, magnetic flux generated by stators 46–47 will be provided with high permeability, low reluctance paths by way of flux transfer rings 28–29 and peripheral segment 53 in a manner to be more fully explained hereinbelow.

A gap 40 is provided between spherical inner rotor 50 and rotatable outer rotor 22. This gap, as mentioned hereinabove, is filled with a suitable sphere supporting and damping fluid 44. Fluids 44 which have been successfully utilized can be either organic or inorganic and have, for example, included bromotrifluoroethylene and chlorotrifluoroethylene. In addition, silicon fluids, highdensity halogenated alkylaryl hydrocarbons, mercury, glycerine and water are considered as suitable alternate fluids. The density of the fluid 44 selected is generally equal to the density of the rotor 50 if rotor 50 is electromagnetically centered. On the other hand if other types of centering are resorted to, it is generally necessary that fluid 44 be of greater density than rotor 50.

The structurally inter-related elements so far described relate to a two-axis gyro including a spherical inner rotor supported and imbedded within a thin film of fluid 44. Both the spherical rotor and the supporting fluids are contained within a fluid-tight rotatable spherical cavity defining structure 22. In operation, spherical cavity defining outer rotor 22 is driven by spin motor 41 about spin axis 16, and inner sphere 50 is rotated in sychronism therewith by the fluid drag provided by fluid 44.

Support for inner sphere 50 may be provided by various methods, such as: density differences between fluids and rotor, by permanent magnets, or by the use of novel microsyn-type circuitry and flux transfer rings, as is the case in the preferred embodiment of the invention, or a combination of these methods, or by other methods described below. The two axis gyro may use four or eight pole microsyn-type stators in the novel configuration shown by the drawings in order to obtain one or more of the following functions: (1) angular and/or radial signal generation; (2) torque generation; and (3) magnetic support for all three axes of the reference sphere 50.

As has been described, four pole stators 46 and 47 are non-rotatively mounted to housing members 15 and 13 respectively, with no parts thereof being mounted to spherical cavity defining rotor 22 for rotative movement therewith. The fact that stators 46 and 47 are fixedly mounted to the gyro housing is distinctly different from conventional microsyn use which would have utilized rotating microsyn stators. This drastic change is in large part due to the unique design of flux transfer rings 28 and 29, which will be described in greater detail hereinafter. In addition, the unique design employed permits the utilization of alternate non-rotating pickoffs such as E-bridges, in combination with a spinning spherical rotor. As well, the use of slip rings and resolvers or reference generators can be eliminated.

Without the use of novel flux rings 28–29, see FIGURES 1 and 2, the two axis gyro would have to resort to prior art schemes such as the use of slip rings, with the serious noise and reliability problems attendant therewith. However, because microsyns 46 and 47 do not rotate with sphere 50, which they electromagnetically center and support, it is necessary that the magnetic flux that they generate be passed through the rotatable cavity defining structure 22 in which sphere 50 rotates. While various alternate designs for flux transfer rings are possible, see for example, FIGURES 2 and 6, the embodiment of FIGURE 2 is preferred.

Flux transfer rings 28–29 employ a pair of annular cylindrical sections in opposed relationship about sphere 50, mediate outer cylindrical sections 23–23a and end caps 24–25, to which they are fixedly joined and tightly sealed in any suitable conventional manner. As shown in FIGURE 2 the flux transfer rings 28 and 29 utilize radially alternate, longitudinally extending magnetic 61 and non-magnetic 62 segments. The radially alternate magnetic segments 61 are made of ferrite or ferromagnetic metal, whereas a suitable insulating non-magnetic material is utilized for portions 62. As a result of the alternate magnetic and non-magnetic segments any magnetic flux generated by the stators will be axially and radially transmitted by rings 28–29 to inner rotor 50 in a manner as shown in FIGURE 4. The alternate axially projecting magnetic and non-magnetic segments of flux transfer rings 28 and 29 prevent the occurrence of magnetic short-cuts within the respective rings. The alternating non-magnetic segments 62 are made of materials such as ceramoplastic, glass epoxy, or any other suitable material which is capable of preventing or limiting the flow of eddy currents, generated by the magnetic field in segments 61 from flowing in rotating outer rotor 22.

The use of radially alternating axially extending magnetic segments 61 embedded or inserted within non-magnetic ceramoplastic or glass epoxy material 62 results in a flux transfer ring that is mechanically strong to resist centrifugal forces. In addition, the construction of rings 28 and 29 enables them to be shrunk-fitted intermediate outer cylindrical segments 23–23a and end caps 24–25. The shrink-fit of the flux transfer ring results in a pre-stressing of the ceramoplastic or glass epoxy material 62, into which radially alternate, axially extending ferromagnetic segments 61 are embedded and results in a dynamically and mechanically sound structure that is able to withstand high speed applications. Axial A.C. magnetic flux transmission an now take place whenever a magnetic segment 61 passes a stator pole. The magnetic flux generated as a result of magnetic segments 61 repetitive transversal subadjacent to the poles 75 of stators 46 or 47 assumes a pulsating character. However, because of the great number of magnetic segments 61 the pulse repetition frequency will be high enough not to interfere with the intended operation of the instrument.

Many advantages of the disclosed two-axis gyro over known prior devices are directly attributable to the unique design of flux transfer rings 28–29. The spherical inner rotor 50 is imbedded in a thin film of supporting fluid 44 with both rotor 50 and fluid 44 being contained in a fluid-tight spherical cavity 45 of a rotatable outer rotor 22. Suitable rotative motor means are provided to drive the outer rotor 22 and thus transmit rotative force to inner rotor 50 by way of the fluid drag created by fluid 44. Complete three-axis centering and support for inner rotor 50 is achieved by A.C. electromagnetic microsyn-type circuitry which is non-rotating and axially supported symmetrically about the unit's spin axis. In addition, as will be explained hereinafter, the microsyn circuits are capable of torquing and signal pick-off functions in the X and Y angular directions. As a direct result of the axial stationary positioning of stators 46 and 47, it is possible to centrally position the spin motor about the floating inner rotor and rotatable outer rotor to result in a structurally improved unit which is reduced in size. In addition, the rotating flux transfer rings allow the microsyn type circuitry to be stationary without the need of long effective magnetic gaps and flux paths which would have been required in prior art schemes.

As an alternative to the design of FIGURE 2, the flux transfer rings may be made of magnetically anisotropic material. The necessity for the flux transfer rings being magnetically anisotropic is that they would short-out the flux generated by the stators 46 or 47 unless some means is provided to prevent the flux from traveling along the circumference of the rings. The circuitous path of magnetic flux around the ring would deprive sphere 50 of this flux and thereby of suitable electromagnetic support. Accordingly, the use of suitable anisotropic material for the flux transfer rings would assure a very high flux reluctance along their circumference, while offering minimum reluctance to any flux passing in an axial and radial direction between sphere 50 and the associated stator 46 or 47. Stated differently, the anisotropic material would assure that the flux rings have very high permeability in their radial or axial direction, and, at the same time, very low permeability in their circumferential direction.

In the event that appropriate material with suitable anisotropic properties is not available, a possible alternative design for flux transfer rings is shown in FIGURE 6. FIGURE 6 illustrates a ring 67 made of a material having a high resistance to electricity which, at the same time, has a high magnetic permeability. Ring 67 is plated with a large number of shorted turns 68 made of material having high electrical conductivity. Shorted turns 68 will effectively attenuate any circumferential magnetic field in the ring, while causing no significant attenuation of its radial fields. The actual number of shorted turns employed may be varied in accordance with the design considerations; best results are attained when a large number is used. It may also be useful, as an alternative solution, to completely enclose the ring in a thin envelope of conductive material.

Returning now for a more detailed discussion of the microsyn-type circuitry employed, it should be repeated that the configuration and position of the stators result in their plural use for such diverse functions as magnetic suspension, magnetic torquing and signal pick-off means. As described briefly hereinabove, two separate stator units 46 and 47 are employed. The units 46–47 are shown in axially opposed positions, symmetrical about the spin axis 16 of floated inner sphere 50. Therefore, flux generated by the opposed stators 46–47 passes axially through flux transfer rings 28–29 and the peripheral magnetic segment 53 of float 50 to result in the A.C. magnetic support and centering of the same. The principle behind the A.C. magnetic support utilized in this invention was developed by P. J. Gilinson of Massachusetts Institute of Technology and is well described in available patents and textbooks so that further treatment of the same at this point is felt to be unwarranted. However, the magnetic and electrical circuitry to obtain the three-axis A.C. magnetic centering, and two-axis torque or signal pick-off for a spherical rotor is new and novel. This circuitry is shown schematically in FIGURE 4.

A top view of four-pole stator 47 is illustrated in FIGURE 3, stator 46 being of the same design and configuration. As shown, the stators comprise four poles which are symmetrically fixedly positioned about the X and Y axes of gyro 12. Each pole of the stator units have field windings 74 fixedly wound about individual poles 75.

As shown by FIGURE 4, which is a cross sectional view of a system similar to FIGURE 1, with only the parts necessary to explain the A.C. magnetic circuitry being retained, the excitation coils of stators 46 and 47 are tuned by appropriately selected tuning capacitors 80 through 83 in a well-known manner, to provide magnetic centering for rotor 50.

However, whereas in the preferred embodiment, each of the stators 46 and 47 are provided with four poles 75, to simplify FIG. 4, only three poles are shown. Likewise, whereas each of the four poles of stators 46 and 47 would be provided with individual field coils 87–91 and 92–95 respectively, for simplification of FIG. 4, two poles 75 of stators 46 and 47 are shown as having two field coils each, and a third pole for both stators 46 and 47, is shown to provide a flux-completing path for the field coil carrying poles. It should be understood that each field coil 87, 88, 90 and 91 of stator 46, and 92, 93, 94, 95 of stator 47 are physically fixed to individual poles, as shown in FIGURE 3. The coils are interconnected in pairs to provide suitable A.C. magnetic support and centering. The pairs formed are 87–88, 90–92, 91–93 and 94–95. The coils 87, 90, 91 and 94 are then connected in series respectively with tuning capacitors 80, 81, 82 and 83 for the generation of the magnetic flux necessary for full three-axis A.C. magnetic support of rotating sphere 50.

As illustrated in FIGURE 4, the A.C. magnetic circuitry results in the flux generated in stators 46–47 passing by way of individual pole pieces 75 through flux transfer rings 28 and 29. The flux then finds a suitable return magnetic path through peripherally mounted magnetic insert 53 of sphere 50, and the remaining poles 75. As a result, a properly centered and supported sphere 50 within spherical cavity 45 of outer rotor 22 is achieved. In addition to the excitation coils of stators 46 and 47 being interconnected in the manner as shown by FIGURE 4 to provide suitable A.C. magnetic support for sphere 50, either stator 46 or 47 may be used to provide suitable signal pick-off for the unit, with the other being utilized as a torquer. These functions are essentially the same as is found in conventional microsyn pick-offs and torquers. Therefore, the pick-off and torquer coils are not shown in FIGURE 4.

As a result of the unique design permitting axial positioning of stators 46–47, it is now possible for spin motor 41 to be centrally positioned about the spherical cavity 45 formed in outer rotor 22 to thus permit a more compact design for the two axis gyro. The compact design leads to a marked increase in reliability and results, as well, in the unit having an improved g-load capability. With stators 46 and 47 being fixedly positioned in opposed axial relationship to each other, sphere 50 will be held centrally therebetween.

As shown in FIGURE 4 the coils of individual poles of the two microsyns are interconnected to provide inter-related electrical circuits tying the coils of one pole to the coils of other poles. The result is the generation and creation of a complex set of inter-related magnetic flux components which can produce magnetic support, pick-off, and torque functions in a three-dimensional array. Furthermore, by symmetrical positioning of individual poles of stator 46 and 47 around sphere 50, and by proper interconnection of individual coils, an efficient magnetic suspension, pick-off and torquing arrangement is possible without the generation of spurious torques and fluxes due to radial displacement of the sphere 50, and without large attendant phase shifts of individual coil voltages and their associated flux components.

While I have described in detail the structure necessary for supporting sphere 50 by means of an A.C. tuned electromagnetic flux generating system, it should be appreciated that various other schemes for support and centering of sphere 50 are available. Several alternate centering schemes working in cooperation with or independent of the microsyn A.C. electromagnetic flux generating schemes for sphere 50 support are possible. The various schemes differ in the following factors:

(1) The density of sphere supporting fluid 44;
(2) The material used for sphere 50;
(3) The type of read-out, which in turn will establish the material and construction of sphere 50;
(4) Whether the unit is to be operated in a high-g or low-g environment; and
(5) The cost of the system.

Broadly speaking, for low-cost, low-g applications, centering is accomplished in a two-fold manner. Because of its hollow design, and, as well the choice of materials from which it is made, rotor 50 can be so constructed that it has a lower density than the liquid in which it is supported, so that radial centering of the sphere can be obtained by centrifugal forces which are generated therebetween. At the same time, the sphere can be axially supported by other suitably appropriate means.

On the other hand, in high-g and/or high performance applications, the inner rotor should be neutrally buoyant and therefore radial centering due to generation of centrifugal forces is not practical. It is then necessary to accomplish centering in all three axes by flexure pivots, permanent magnets, or by an electromagnetic technique, such as is described above.

It should be emphasized at this point that the preferred manner for centering and supporting the rotatable sphere 50 is by electromagnetic means as described hereinabove. The use of electromagnetic supporting and centering means results in a system which is essentially free from any spring restraints. Small reaction torques will result from the use of flexure pivots or wire suspension. Nonetheless, in order to fully describe the scope of the invention, attention is now directed to the discussion of suitable alternate centering and supporting techniques.

Alternative schemes and structures to center and support a spherical inner rotor are illustrated in FIGURES 5 and 5A. FIGURE 5A details the structure necessary to provide for a two-axis gyro with an inner float axially centered by permanent magnets. It should be emphasized at this point that both the schemes shown in FIGURES 5 and 5A do not rely upon electro-magnetic support or centering of the sphere 50. Sphere 50 is constructed of suitable materials which result in its density being less than that of the fluid 44 which is used. Accordingly, the float will tend to radially center itself about the spin axis of the rotating fluid. The use of permanent magnets is illustrated in FIGURE 5A to provide for axial support and centering of the sphere 50 along the spin axis.

Spin axis bearings 201 of FIG. 5A connect gimbal 202 with spherical cavity forming structure 22. A suitable driving motor, shown generally by numeral 203, and which can be of any suitable design such as a hysteresis or induction motor is utilized to drive rotatable outer rotor 22. In particular, a hysteresis motor comprising motor stator 204 drives a hysteresis ring 205 which is fixedly mounted to rotatable spherical cavity forming structure 22. Spherical rotor 50 consists of non-magnetic annular ring segments 207a and two permanent magnets 207b and 207c, having their individual north poles oriented and projecting toward the outer periphery of sphere 50. In addition, rotatable sphere 50 carries mirror 209 along its central periphery to reflect light passing through window 211 from an optical pick-off unit 212 which will be described in conjunction with FIGURE 5 herein below. Window 211 is symmetrically mounted about the spin axis of inner rotor 50, opposite to mirror 209, as shown in FIGURE 5A. As is also shown in FIGURE 5A cylindrical permanent magnets 208a and 208b are symmetrically positioned on opposite sides of sphere 50 about the spin axis thereof. Both magnets 208a and 208b are made of permanent magnetic material and are suitably joined to outer cylindrical member 206 and window 211 to provide a fluid-tight spherical cavity which houses fluid 44 and sphere 50. The permanent magnets 208a and 208b are axially aligned with the spin axis opposite the magnetic inserts 207b and 207c carried by spherical rotor 50. As can also be seen by FIGURE 5A a repulsion effect is created between sphere 50 and rotatable outer rotor 22 by orienting the north magnetic pole of segments 207b and 207c opposite to the north magnetic poles of magnetic cylindrical segment 208a and 208b. In this manner, axial support and centering of rotor 50 free of any angular restraint thereon is achieved. Accordingly, rotor 50 tends to center itself about the spin axis of the rotating fluid due to the centrifugal forces cooperating therebetween, and at the same time is axially centered along the spin axis by the repulsion effect of permanent magnets 207b, 207c and 208a and 208b. The moments of inertia of spherical rotor 50 are so chosen as to give it a preferred axis of rotation which is parallel to the magnet axes as shown in FIGURE 5A.

As a further illustration of an alternate scheme which may be used in place of the electromagnetic flux generating scheme hereinabove described for centering and support of an inner rotatable sphere within a spherical cavity of an outer rotor, the structure and configuration of FIGURE 5 which is a cross sectional view is referred to. In this instance the density of fluid 44 is again greater than the density of sphere 50. Under these conditions, if the floated sphere 50 is rotated at sufficiently high speed, centering in a plane normal to the spin axis can be realized by centrifugal forces. In FIGURE 5 numerals 101 are conventional spin bearings and pivots which operate in their customary manner. Numeral 104 indicates the stator of an appropriate hysteresis type motor which is fixedly mounted to the housing unit. Stator 104 cooperates with its associated hysteresis rotor 105 to result in movement of rotatable cavity 22 about appropriate spin bearings 101 of gimbal assembly 102.

Suitable mounting means 103 pivotally connect gimbal assembly 102 to a housing 124. Mounted for rotation with the spherical cavity structure 22 is an appropriately designed spherical member 50. Sphere 50 is axially supported by use of a suspension wire 108. Radial suspension for sphere 50 is provided by the centrifugal forces generated between sphere 50 and an appropriate fluid 44. The preferred fluid 44 utilized and suitable alternatives have been described hereinbefore. As illustrated in FIGURE 5, a support ring 114 along with threaded nut 115 are used to fasten and secure the rotatable sphere 50 to the supporting wire 108 and thereby to the rotatable cavity forming structure 22. Support wire 108 is a very thin gauge wire which is purposely selected so that the precession-axis spring restraint which results from the connection of the wire to sphere 50 will be held to a minimum while providing adequate strength to support sphere 50 in an axial direction. FIGURE 5 illustrates a design which utilizes partial fill of cavity 45 with fluid 44. It is also possible to modify the above structure and permit fluid 44 to fill the entire cavity formed by rotatable cavity structure 22. In this case, the density of spherical member 50 could be close or equal to (but still less than) that of fluid 44 and it would then be possible for the wire supporting forces to be reduced. Also, since the structure embodied in FIGURE 5 utilizes an optical signal read-out device, which will be described in greater detail immediately hereinafter, it will then be necessary for fluid 44 to be transparent to permit proper functioning of the optical pick-off.

In addition, other axial centering methods which can be used as alternate embodiments for the invention include the following:

(1) A partial liquid fill combined with partial gas-fill of the gap between inner and outer rotors as shown in FIGURE 5;

(2) A simultaneous use of two liquids with different densities in the gap between the inner and outer rotors;

(3) The use of additional spherical floats in the fluid film, with the diameter of these floats being smaller than the gap width.

Returning now to FIGURE 5 to treat in greater detail the optical signal generating system employed, and as well to detail the procedure for applying signals to the appropriate gimbal torquers, we note firstly that the spin axis bearings 101 support the spherical cavity forming structure 22 in appropriate gimbal structure 102. The stator 104 of the hysteresis motor drives the spherical cavity forming member 22 by way of hysteresis ring 105. Spherical rotor 50 is supported axially by wire 108 and radially by fluid 44. Window 111 permits light from the optical pick-off unit 112 to pass therethrough. The light passed by window 111 is then reflected by mirror 109, which is fixedly carried on spherical rotor 50. Gimbal bearings 116 support gimbal structure 102 in the outer housing 124. Hollow spherical rotor 50 will be centered inside rotatable cavity 22 in a manner as has hereinabove been discussed and upon any misalignment occuring between the sphere 50 and the spherical cavity of unit 22 viscous drag torques will be developed. The angle subtended by the two spin axes is proportional to the angular rate with which the gyro case is rotated in inertial space under steady state conditions. Accordingly, any relative angular deflection which occurs between sphere 50 and rotatable spherical cavity 22, about the two axes normal to the spin axis, will be indicated by an optical signal which is obtained by reflection of a light beam from mirror 109. This reflected light beam is picked up by a suitable detector in the two-axis optical pick-off unit 112 and an electrical signal will result therefrom. This is a conventional operation which is well known by those skilled in the art and further discussion is accordingly felt to be unnecessary.

Looking further to the structure of FIGURE 5, it will be noted that suitable torquer magnets 117 provide the necessary field for torquer coils 118 supported by torquer structure 119. In addition, an electromagnetic return path 120 provides the means for a closed magnetic circuit. At the opposite end of housing 124, a ferrite rotor 121 operates, in combination with coils provided on a ferrite stator 122, as an electromagnetic pick-off. It is, of course, possible that the radial gaps in the gimbal pick-off and torquer, and between gimbal structure 102 and housing 124 may be filled with a viscous fluid to provide viscous damping and/or flotation if required for proper operation of the system. A signal obtained from the light beam reflected by mirror 109, which is proportional to the relative angular deflection between spherical rotor 50 and spherical cavity forming structure 22, is amplified by a suitable amplifier associated with the two-axis optical pick-off unit 112. The signal from the amplifier, in turn, feeds torquer coil 118 in order to maintain the spin-axis of rotor 50 fixed in inertial space. In this manner correction of a deviation can be accomplished in a well-known manner.

The preferred embodiment shown in FIGURE 1 not only provides for electromagnetic centering and support by use of the unique and novel A.C. magnetic flux generating circuitry and its associated flux transfer ring, but also enables the utilization of the same flux generating microsyn-type stators for signal pick-off or torquing functions in a conventional manner. The symmetrical spacing of the poles of the microsyns about the X and Y axis is adequately brought out in FIGURE 3. The ring-shaped stators 46 and 47 have four axially protruding poles each, and each pole carries appropriate excitation coils. The protruding poles are shown in FIGURE 3 by the numeral 75 with the coils being numbered 74a to 74d. Because of the relationship of the magnetically soft rotor and axial poles 75, in the centered or null-position, the magnetically soft rotor covers only one half of the pole surface area of the stator at any one time. Therefore, the torquer excitation coils can be so energized that the magnetic soft rotor will experience a force tending to rotate it in such a direction as to completely cover the magnetic poles of the torquer stator 46. In this manner, since each torquer pole is only partially covered by the spherical rotor, a very effective application of the torque through rotatable cavity unit 22 to the sphere 50 can be achieved. By the above-described structure operating in a conventional manner well known to those skilled in the art, a torquing function in both the X and Y axes, assuming that the spin axis coincides with the Z axis, is obtained.

At the same time, the other stator 47 in addition to providing electromagnetic support and centering for rotatable sphere 50 can also serve as a signal pick-off unit. FIGURE 3 illustrates the top view of the four-pole microsyn unit 47. Under nominal operating conditions, hollow rotor 50 will be magnetically centered inside the spherical cavity 45 provided by rotatable spherical cavity unit 22. Due to the application of inertial forces, any misalignment between the spin axes of rotatable sphere 50 and outer rotor 22 will result in viscous drag torque being developed. The angle subtended by these two spin axes is proportional to the angular rate with which the gyro case 13–15 is rotated in inertial space, under steady state conditions. The result is a deviation of the X or Y axes of rotor 50 from their normal positions, as shown by FIGURE 4. The subtended angle can be determined by use of stator 47 in a manner well known to those skilled in the art. To this end, coils 74a and 74c provide signals proportional to the angular input about the X axis. Coils 74b and 74d, provide signals proportional to the angular input about the Y axis. In addition, stator 46 can be used in a similar way to produce additional pick-off signal outputs if it is so desired. Or, has been stated hereinabove, stator 46 may be utilized instead as a torquer. This is similar to the use of microsyns for torqueing and signal pick-off functions as is well known to persons skilled in the art.

It can be accordingly seen that the invention described hereinabove relates to a gyroscope using a spherical inner rotor supported in a thin film of fluid. The spherical rotor and its supporting fluid are contained within a rotatable spherical cavity. The spherical rotatable float, the thin film of supporting fluid, and the rotatable spherical cavity are capable of synchronous rotation at high speeds, the spherical cavity being rotatable by a suitable spin motor. Rotation of the spin motor results in the generation of driving forces for the spherical floated rotor by way of fluid drag. Centering and support of the floated rotor within the spherical cavity is attained by suitable electromagnetic means in the preferred embodiment, and in addition suitable torquing and deviation signal sensing means to determine any deviation between the spin axes of the inner and outer rotor is obtained by suitable electromagnetic means.

As a result of the use of tuned excitation circuits for magnetic centering, it is possible also to derive signals proportional to linear acceleration inputs from the voltages across the excitation coils. This is a technique well known to those skilled in the art from similar microsyn-type devices and need not be described in detail.

As a further illustration of the versatility of the invention, the use as a two-stage gyro will now be discussed. Shown schematically in FIGURE 5 is one cross section of a two-stage gyro. The embodiment of FIGURE 5 includes an arrangement of the basic two-axis gyro inside a two-axis gimbal system. As constructed, the two-stage gyro consists of an inner gyro which is a spinning spherical float and an outer gyro represented by the spinning container 22 embodying the rotating spherical cavity 45 in which the spinning rotor 50 is housed. The rotatable spherical cavity forming structure 22 is mounted in a suitable gimbal system. The inner gyro is a two-axis gyro and so is the outer gyro. The inner gyro is the inertial sensing element which controls the outer gyro. The outer gyro accordingly acts as a stabilizing gyro which permits the inner gyro to perform with maximum sensitivity as a nullseeking angular sensor. The signal pick-offs of the inner gyro are connected to amplifiers and compensating networks which produce torquer currents for the outer gyro torquers. Some advantages of such a gyro include low drift, very low sensitivity to linear accelerations, and very favorable adjustable dynamic characteristics. FIGURE 5 can show only one gimbal axis of the outer gyro. The other gimbal axis is normal to the paper plane.

A two-stage gyro-accelerometer consists of a two-degree of freedom outer gyro and a floated rotor inner gyro with magnetic centering as described above. The voltages across the tuned excitation coils are used to generate acceleration signals as mentioned before, and as is well known to those skilled in the art. The angular displacement between the inner rotor and the spherical cavity in which it is floated, the outer gyro rotor, is measurable and utilized to torque the outer gyro and thereby make it precess in such a way as to maintain the spin axes of both inner and outer gyros fixed in inertial space. In addition, signals proportional to linear acceleration are provided. Stated differently, the structure of the combination of elements include a spinning spherical rotor 50 which can be utilized as the inner gyro inside the gyrowheel of a conventional two degree of freedom gyro. As a result of this new and novel combination, the inner gyro is used as angular sensor with extremely low threshold to produce torquing signals for the outer gyro. The inner gyro is essentially insensitive to acceleration drift error and therefore can significantly improve the performance of the conventional outer gyro. Furthermore, as can be mathematically shown, as a result of the addition of the inner gyro controlling the outer gyro, the effective total angular momentum of the outer gyro is substantially increased. In essence, a two-stage gyro can be endowed with an artificial additional angular momentum much greater than the physical momentum of the outer gyro rotor alone. This increased angular momentum can be modulated for drift compensation, or varied as one of the parameters of a guidance or flight control system. The increase in effective angular momentum results in a corresponding decrease in drift rate. It therefore follows that it is possible and feasible to obtain very low drift rate from a two-stage gyro using low-cost ball bearing gimbal suspension rather than flotation and pivot-jewel bearings. Therefore, in summary the two-stage gyro concept may be described as a combination of an inner gyro (gimballess viscously coupled free-rotor type) with an outer gyro of conventional design and an amplifier and compensation network between the inner gyro pick-off and the outer gyro gimbal torquer. The result is the creation of an equivalent additional angular momentum for the outer gyro by electronic means.

FIGURE 7 illustrates schematically a three-axis inertial measurement unit utilizing two viscously-coupled gyro-accelerometers. Advantages of a structure as shown by FIGURE 7 and described hereinbelow include a total elimination of internal gyro and accelerometer gimbals. Also, the system is capable of operating in high-g environments with substantially reduced error. Furthermore, a reduction of the system sensing elements to two spinning floats which are capable of providing all attitude and acceleration information in an inertial triad, results in a greatly simplified system compared to those known heretofore. In addition, error reduction by averaging is possible by use of a redundant axis. Lastly, the use of a system as shown by FIGURE 7 greatly simplifies the complexity of three or four-gimbal platforms which usually require either three single-gimbal gyros or of two two-gimbal gyros for stabilization. The high cost of such systems which is largely because of the mechanical complexity of the gyros and accelerometers used, has thus been substantially reduced. This is particularly true for so-called high-g applications where floated gyros must be used. As an alternative solution, high-g missiles can be equipped with body-mounted gyros. The ensuing problem of determining the true inertial attitude of the missile, however, requires the use of an Euler-angle computer. A floated three or four gimbal platform of the type illustrated in FIGURE 7 with high-g gyro-accelerometers on it produces the proper inertial angles directly at lower cost.

In FIGURE 7, two floated spinning spheres 50 and 51 are contained in a common housing 303. Each sphere is rotated at a suitable speed inside a rotatable spherical cavity 22 and 23. The spherical cavities are rotated or driven by appropriate hysteresis-type electric motors 306 and 307. Each sphere 50 and 51 is respectively magnetically centered between two microsyn-type stators 308–309 and 310–311. The stators can also be used as two-axis signal pick-offs and torquers. Flux transfer rings 312, 313, 314 and 315 permit the circulation of magnetic flux between the stators and the rotating spheres in axial and radial directions. At the same time, the flux transfer rings prohibit a circumferential magnetic short-circuit. Reference is made to FIGURE 2 and the appropriate description for a more detailed explanation of suitable flux transfer rings. As illustrated, the two spinning spheres provide angular signals with a very low threshold about all three axes of an inertial reference frame. Further, if the spheres are "over-floated" by a suitable percentage, they can be utilized as accelerometer proof-masses. The magnetic centering circuit provided by the stators can then provide acceleration signals along the same three axes, as is well known to those skilled in the art. The structure so far defined provides a total system without the use of internal gimbals for either gyros or accelerometers. Only three or four platform gimbals, depending upon the application of the system, are utilized.

Gimbal torquers 316, 317 and 318 are controlled by the microsyn-type pick-offs from the two spinning spheres. The low threshold of the spinning float sensors provides low drift performance for the instrument. In addition, angular insensitivity of the sensors to acceleration inputs enables excellent results in high-g environments. Also, since there is a redundant input axis available, averaging of signal outputs can be used in order to reduce any residual drift uncertainties for this axis.

Initially, alignment of the platform can be accomplished by precessing the spinning floats 50 and 51 with the help of microsyn-type torquers 309 and 311. These torquers 309 and 311 can also be used for drift compensation, as is well known to those skilled in the art.

What is claimed and desired to be secured by United States Letters Patent is:

1. Apparatus comprising, spherical cavity forming structure, a spherical rotor, said spherical rotor enclosed within said spherical cavity forming structure, said spherical cavity forming structure rotatably mounted in a suitable housing, driving means for spinning said spherical cavity forming structure within said housing, a plurality of stator coils positioned in said housing adjacent said spherical cavity forming structure, and at least one flux transfer ring disposed in said spherical cavity forming structure, serving to transfer flux to said spherical rotor, for the electromagnetic centering of same, and means including a film of liquid for supporting said spherical rotor within said cavity forming structure.

2. Apparatus comprising, spherical cavity forming structure, a spherical rotor, said spherical rotor enclosed within said spherical cavity forming structure, said spherical cavity forming structure rotatably mounted in a suitable housing, driving means for spinning said spherical cavity enclosing structure within said housing, and means including a film of liquid for centering and supporting said spherical rotor within said spherical cavity forming structure, said means for centering and supporting said spherical rotor also utilizing electromagnetic A.C. flux generating circuitry.

3. Apparatus comprising, spherical cavity forming structure, a spherical rotor, said spherical rotor enclosed within said spherical cavity forming structure, said spherical cavity forming structure rotatably mounted in a suitable housing, driving means for spinning said spherical cavity enclosing structure within said housing, and means including a film of liquid for centering and supporting said spherical rotor within said spherical cavity forming structure, said spherical cavity forming structure comprising cylindrical outer rings forming a continuous outer cylindrical surface, cylindrical flux transfer ring sections having one surface thereof formed contiguous with the inner surface of said outer cylindrical members, and inner end caps contiguous with the other surface of said flux transfer rings, said outer cylindrical rings, flux transferring rings, and end surfaces being joined in a fluid-tight spherical cavity forming structure, said driving means including a rotor fixedly mounted to the outer cylindrical rings for movement therewith and a fixedly positioned stator for driving said fluid-tight spherical cavity forming structure, and said means for centering and supporting said spherical rotor including opposed fixedly mounted A.C. magnetic flux generating circuitry axially aligned with said flux transferring rings, such that any flux generated by said axially positioned means will pass through said flux transferring rings to provide centering and support for said spherical rotor.

4. The apparatus as defined by claim 3 wherein said spherical rotor includes a peripheral magnetic flux conducting ring formed integral therewith, such that any flux generated by said A.C. magnetic flux generating means and passed through said flux transferring rings will complete its path through said peripheral magnetic flux conducting ring of said spherical rotor.

5. The apparatus as defined by claim 3 wherein a fluid having a predetermined density and viscosity is contained in said spherical cavity forming structure, said spherical rotor being immersed therewithin, said flux transferring ring being made of a non-magnetic conducting material and including a plurality of radial alternate segments made of magnetically soft material extending longitudinally therethrough, such that any flux generated by said axially positioned A.C. flux generating means will be carried by said segments made of magnetically soft material with low eddy current losses to thus provide maximum magnetic centering and support to said spherical rotor.

6. The apparatus as defined by claim 3 wherein one or both of said axial fixed A.C. magnetic flux generating means also provide suitable torquing or pick-off for said rotatable spherical cavity forming structure, and said spherical rotor.

7. The apparatus as defined by claim 5 wherein one of said fixed axially positioned A.C. magnetic flux generating means provides torquing means for said spherical cavity forming rotor and the axially oppositely positioned A.C. magnetic flux generating means provides pick-off signal means for the apparatus.

8. The apparatus as defined by claim 1 wherein said spherical rotor is immersed in a fluid having predetermined density and viscosity within said spherical cavity forming structure, suitable wire supporting means are provided between said spherical cavity forming structure and said spherical rotor to axially support the same, radial support and centering for said spherical rotor being provided by centrifugal forces generated between said rotor and said fluid in which it is immersed, wherein optical deviation signal pick-off means are employed, said optical deviation pick-off means including light reflectors mounted on said spherical rotor for movement therewith about said wire supporting means and a fixedly positioned light source, any deviation signal generated thereby being detected by suitable detecting means.

9. The apparatus as described by claim 1 wherein permanent magnets having similar magnetic poles are axially aligned in opposed positions symmetrically about the spin axis of said spherical cavity forming structure, said spherical rotor is provided with permanent magnetic peripheral inlays axially in line with said permanent magnets of said spherical cavity forming structure, such that said sphere is centered and supported by magnetic repulsion therebetween, optical signal deviation sensing means including a light reflecting means positioned axially in line with the spin axis of said spherical cavity and said spherical rotor.

10. The apparatus as defined by claim 1 comprising a first spherical cavity forming structure, a second spherical cavity forming structure, means for independently rotating said first and second spherical cavity forming structures about transverse spin axes, a spherical rotor enclosed within each of said first and second spherical cavity forming structures, first and second A.C. magnetic flux generating means oppositely positioned in fixed relationship about said first and second spherical cavity forming structures, said A.C. magnetic flux generating means providing centering and support for said spherical rotors, a housing enclosing said first and second spherical cavity forming structures therewith, a three axes gimbal platform, said housing being pivotally connected to said three axes gimbal platform, gimbal torquing means operatively connected to said three axes gimbal platform for movement thereof, said A.C. magnetic flux generating means providing deviation signal sensing means to control said gimbal torquing means.

11. The apparatus as defined by claim 10, comprising first and second magnetic flux generating means providing three axis centering and support for said spherical rotors, as well as providing three-axis angular readout and three-axis linear acceleration signal readout.

12. The apparatus as defined by claim 9 fixedly mounted in a two-axis gimbal structure having a pair of gimbal torquers and a pair of gimbal pick-offs, and wherein said pair of gimbal torquers are controlled by signals from said optical signal deviation sensing means.

13. A dual-rotor inertial sensor comprising, means forming a fluid tight spherical cavity, a fluid of predetermined density and viscosity contained within said fluid tight spherical cavity, a spherical rotor positioned within said fluid tight spherical cavity, said means forming a fluid tight spherical cavity rotatably mounted within a housing, and means for rotating said means forming a fluid tight spherical cavity to result in rotation of said spherical rotor due only to the viscosity of said fluid.

14. The dual-rotor inertial sensor as set forth in claim 13 including electromagnetic means fixedly positioned within said housing, about said means forming said spherical cavity, providing three-axis centering to said spherical rotor to center the same within said spherical cavity.

15. The dual-rotor inertial sensor as set forth in claim 13 including electromagnetic means fixedly positioned within said housing about said means forming said spherical cavity, providing three-axis magnetic centering for said spherical rotor, and two-axis torquing for deviation correction.

16. A dual-rotor inertial sensor comprising, a housing, an outer rotatable rotor, rotatably mounted in said housing, said outer rotatable rotor having a fluid tight spherical cavity formed therewithin, opposed axially aligned flux transfer means extending from the otuer surface of said outer rotatable rotor to said spherical cavity, a fluid of predetermined density and viscosity contained in said fluid tight spherical cavity, a spherical rotor immersed in said fluid tight spherical cavity for rotation therewithin, means for rotating said outer rotor, rotation of said outer rotor resulting in rotation of said spherical rotor due only to said viscosity of said fluid, and flux generating means fixedly mounted to said housing, about said outer rotor, cooperating with said flux transfer rings to provide three-axis magnetic centering and support for said spherical rotor.

17. The dual-rotor inertial sensor as set out in claim 16 wherein, said spherical rotor has a peripheral magnetic flux conducting annular segment integrally formed thereto, said magnetic flux conducting annular segment cooperating with said opposed flux transfer means and said flux generating means to center and support said spherical rotor within said spherical cavity.

18. The dual-rotor inertial sensor as set forth in claim 16 wherein said fixed flux generating means in addition provides torquing for said spherical rotor and pick-off signals for the inertial sensor.

References Cited

UNITED STATES PATENTS 3,260,122   7/1966   Rocks.

FRED C. MATTERN, Jr., Primary Examiner

MANUEL ANTONAKAS, Assistant Examiner

U.S. Cl. X.R.

74—5, 5.6